US012673461B2

(12) United States Patent
Brun et al.

(10) Patent No.: US 12,673,461 B2
(45) Date of Patent: Jul. 7, 2026

(54) HYBRID MANUFACTURING METHOD COMPRISING AN ADDITIVE MANUFACTURING STEP AND A PRODUCT RESULTING FROM SUCH A METHOD

(71) Applicant: Volvo Truck Corporation, Gothenburg (SE)

(72) Inventors: Stéphane Brun, Montceau les Mines (FR); Laurent Bourseguin, Villeurbanne (FR)

(73) Assignee: Volvo Truck Corporation, Gothenburg (SE)

( * ) Notice: Subject to any disclaimer, the term of this patent is extended or adjusted under 35 U.S.C. 154(b) by 94 days.

(21) Appl. No.: 18/648,618

(22) Filed: Apr. 29, 2024

(65) Prior Publication Data

US 2024/0367374 A1     Nov. 7, 2024

(30) Foreign Application Priority Data

May 5, 2023     (EP) ..................................... 23171941

(51) Int. Cl.
*B29C 64/188*     (2017.01)
*B29C 71/00*     (2006.01)
(Continued)

(52) U.S. Cl.
CPC ............ *B29C 64/188* (2017.08); *B29C 71/00* (2013.01); *B29C 71/02* (2013.01); *B33Y 40/10* (2020.01); *B33Y 40/20* (2020.01); *B29C 64/118* (2017.08); *B29C 2071/022* (2013.01); *B29L 2031/30* (2013.01)

(58) Field of Classification Search
CPC ... B29C 64/118; B29C 64/245; B29C 64/188; B29C 71/00; B33Y 40/20; B33Y 40/10
See application file for complete search history.

(56) References Cited

U.S. PATENT DOCUMENTS

2007/0108664 A1*   5/2007   Luan ...................... B33Y 10/00
                                                      216/87
2015/0225617 A1*   8/2015   Schwoeppe ......... B32B 37/0038
                                                      502/155
(Continued)

FOREIGN PATENT DOCUMENTS

DE        102013217825 A1     3/2015
DE        102015118607 A1     5/2017
(Continued)

OTHER PUBLICATIONS

Machine Translation of Cott, 2019 (generated Sep. 25, 2025), Espacenet (Year: 2019).*
(Continued)

*Primary Examiner* — Andrew L Swanson
(74) *Attorney, Agent, or Firm* — Withrow & Terranova, PLLC

(57)     ABSTRACT

A hybrid manufacturing method comprising providing a base member, the base member comprising a metallic portion provided with a coating; providing a surface treatment to all or part of the coating, the surface treatment comprising a mechanical, a chemical and/or a physical treatment, to obtain a treated base surface; and forming an additional part onto the treated base surface by additive manufacturing.

8 Claims, 2 Drawing Sheets

(51) Int. Cl.

| | | |
|---|---|---|
| *B29C 71/02* | (2006.01) |
| *B33Y 40/10* | (2020.01) |
| *B33Y 40/20* | (2020.01) |
| *B29C 64/118* | (2017.01) |
| *B29L 31/30* | (2006.01) |

(56) References Cited

U.S. PATENT DOCUMENTS

| | | | |
|---|---|---|---|
| 2016/0175934 A1 | 6/2016 | Lacy et al. | |
| 2017/0015066 A1 | 1/2017 | Herrmann et al. | |
| 2020/0078862 A1 | 3/2020 | Ehrstrom et al. | |
| 2021/0308937 A1* | 10/2021 | Broach | B29C 64/106 |
| 2022/0162375 A1* | 5/2022 | Condie | C08G 59/245 |
| 2022/0371229 A1* | 11/2022 | Klein | B29C 64/124 |
| 2024/0158920 A1* | 5/2024 | Kumar | C23C 22/57 |

FOREIGN PATENT DOCUMENTS

| | | | | |
|---|---|---|---|---|
| EP | 2801512 | A1 | 11/2014 | |
| EP | 2907603 | A2 | 8/2015 | |
| WO | 19068786 | A1 | 4/2019 | |
| WO | WO-2019068786 | A1 * | 4/2019 | ......... B29D 99/0014 |

OTHER PUBLICATIONS

Alhmoudi, A. et al., "Joining of polymer-metal hybrid structures by fused deposition modelling," 2022 Advances in Science and Engineering Technology International Conferences (ASET), Feb. 21-24, 2022, Dubai, United Arab Emirates, IEEE, 5 pages.

European Search Report for European Patent Application No. 23171941.0, completed Sep. 8, 2023, 3 pages.

* cited by examiner

HYBRID MANUFACTURING METHOD COMPRISING AN ADDITIVE MANUFACTURING STEP AND A PRODUCT RESULTING FROM SUCH A METHOD

PRIORITY APPLICATIONS

The present application claims priority to European Patent Application No. 23171941.0, filed on May 5, 2023, and entitled "HYBRID MANUFACTURING METHOD COMPRISING AN ADDITIVE MANUFACTURING STEP AND A PRODUCT RESULTING FROM SUCH A METHOD," which is incorporated herein by reference in its entirety.

TECHNICAL FIELD

The disclosure relates generally to a manufacturing method. In particular aspects, the disclosure relates to a hybrid manufacturing method comprising an additive manufacturing step and a product resulting from such a method. The disclosure can be applied in heavy-duty vehicles, such as trucks, buses, and construction equipment. Although the disclosure may be described with respect to a particular vehicle, the disclosure is not restricted to any particular vehicle.

BACKGROUND

Traditional assembly of an additional component on a metallic structure may comprise fastening system such as metallic or plastic clips, screw joints, etc. These solutions require at least one drilling, cutting, etc. step of the metallic structure, an appropriate supply chain and an installation process. This may increase the manufacturing time and costs. Therefore, a need exists to provide a metallic structure equipped with an additional component the manufacturing of which being quicker, versatile and/or cost effective. In other words, a need exists to reduce as far as possible manufacturing time and associated costs.

SUMMARY

According to a first aspect of the disclosure, a hybrid manufacturing method comprises: providing a base member, the base member comprising a metallic portion provided with a coating; providing a surface treatment to all or part of the coating, the surface treatment comprising a mechanical, a chemical and/or a physical treatment, to obtain a treated base surface; and forming an additional part onto the treated base surface by additive manufacturing. The surface treatment may result in a total or partial removal and/or a chemical and/or physical change of the coating itself. In other words, the surface treatment may be a surface alteration. For example, the surface treatment may comprise sanding, grinding, blast cleaning or any mechanical surface treatment, stripping, etching, pickling or any chemical surface treatment, heating, firing, plasma or laser treatment or any physical surface treatment. For example, fused deposition modeling (or FDM) may be used as additive manufacturing. A single or several additional parts may be formed. The first aspect of the disclosure may seek to provide quick, versatile and/or cost effective way of manufacturing. A technical benefit may include a strong fastening/adhesion strength between the base member and the additional part, for example due to the surface treatment step, with quick, versatile and cost effective way of manufacturing. For example, the surface treatment may generate microstructure improving a mechanical anchorage of the additional part on the treated base surface. A chemical treatment may provide a microstructure when the plasma treatment may provide a nanostructure to the treated base surface.

In some examples, the surface treatment may comprise removing at least in part the coating.

In some examples, the surface treatment may comprise a predetermined pattern. The surface treatment may result in a pattern, for example with reliefs, formed at the treated surface. For example, the predetermined pattern may have a shape of grid, hatch, staggered, line grids, pads, etc. For example, the all or part of the coating may be have been removed in accordance with such a predetermined pattern. This may help to provide a regular and homogeneous interface between the base member and the additional part with a good balance between the extent of the surface treatment and the resulting fastening/adhesion strength.

In some examples, the coating may comprise resin and the surface treatment may comprise thermal or chemical treatment to provide adhesive features to at least a portion of the coating. By 'adhesive features', it is meant that it confers a shear resistance that is superior or equal to the shear resistance of the base member material itself, in such a way that the coating does not constitute the weakest point along shear direction. As a result, the shear resistance of the base member material constitutes sort of a minimum threshold value below which it is considered that the interface is adhesive and above which the interface might not be adhesive (e.g. minimum shear force). However, such minimum threshold value depends on the vibration environment (where the component will be installed and operated, e.g. unsprung mass such as axle, sprung mass such as chassis). Such adhesive features may help to improve fastening/adhesion strength between the base member and the additional part, withstanding external loads and vibrations in use. For example, the thermal or chemical treatment may locally transform/change/impact the resin to be used as an adhesion agent. This may help to reduce as far as possible manufacturing time and associated costs.

In some examples, the hybrid manufacturing method may comprise, before forming the additional part, providing a layer of adhesive material onto the treated base surface. For example, the adhesive material may be a silane type coupling agent.

In some examples, the hybrid manufacturing method may comprise, after forming the additional part, a post-treatment such as annealing at high temperature. This may improve the adhesion between the additional part and the treated base surface, or between the additional part, the optional adhesive material and the treated base surface. The high temperature may be 100° C. or more.

In some examples, the additional part may be made of polymeric material, for example thermoplastic, thermoset or resin. For example, the polymeric material may be a fiber reinforced polymer or thermoplastic. Such a material may help to provide quick, versatile and cost effective way of manufacturing while providing satisfactory strength/resistance to the additional part(s).

In some examples, the coating may comprise an optional e-coat (or electro deposition coating) primer and a top-coat layer. A top-coat layer may be a layer of paint or the like.

In some examples, the base member may be all or part of a vehicle chassis or of a vehicle body, and the additional part may a bracket, a fastener, a mounting part, an informative element such as a brand plate, logo, location marker, or the like.

According to a second aspect of the disclosure, a device may be obtained by the hybrid manufacturing method according to any example of the present disclosure.

The above aspects, accompanying claims, and/or examples disclosed herein above and later below may be suitably combined with each other as would be apparent to anyone of ordinary skill in the art.

Additional features and advantages are disclosed in the following description, claims, and drawings, and in part will be readily apparent therefrom to those skilled in the art or recognized by practicing the disclosure as described herein. There are also disclosed herein control units, computer readable media, and computer program products associated with the above discussed technical benefits.

BRIEF DESCRIPTION OF THE DRAWINGS

With reference to the appended drawings, below follows a more detailed description of aspects of the disclosure cited as examples.

FIGS. 4A to 4E show examples of treated base surfaces.

DETAILED DESCRIPTION

Aspects set forth below represent the necessary information to enable those skilled in the art to practice the disclosure.

Figures 1, 2:
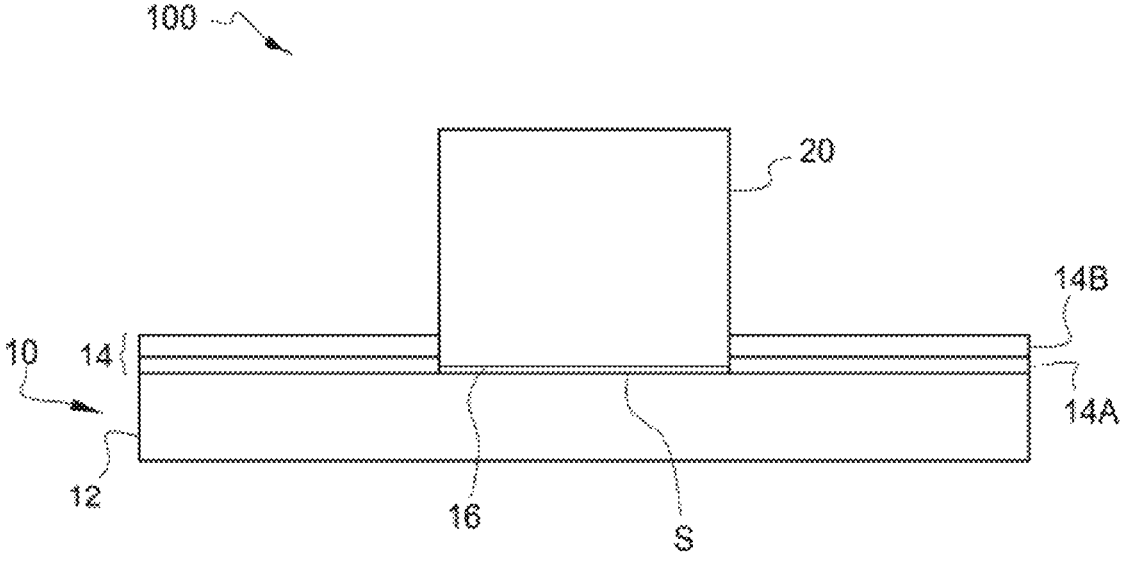
FIG. 1 is an exemplary device obtained by a hybrid manufacturing method according to one example.
FIG. 2 is an exemplary vehicle, serving as an example of base member according to one example.
Figure 3:
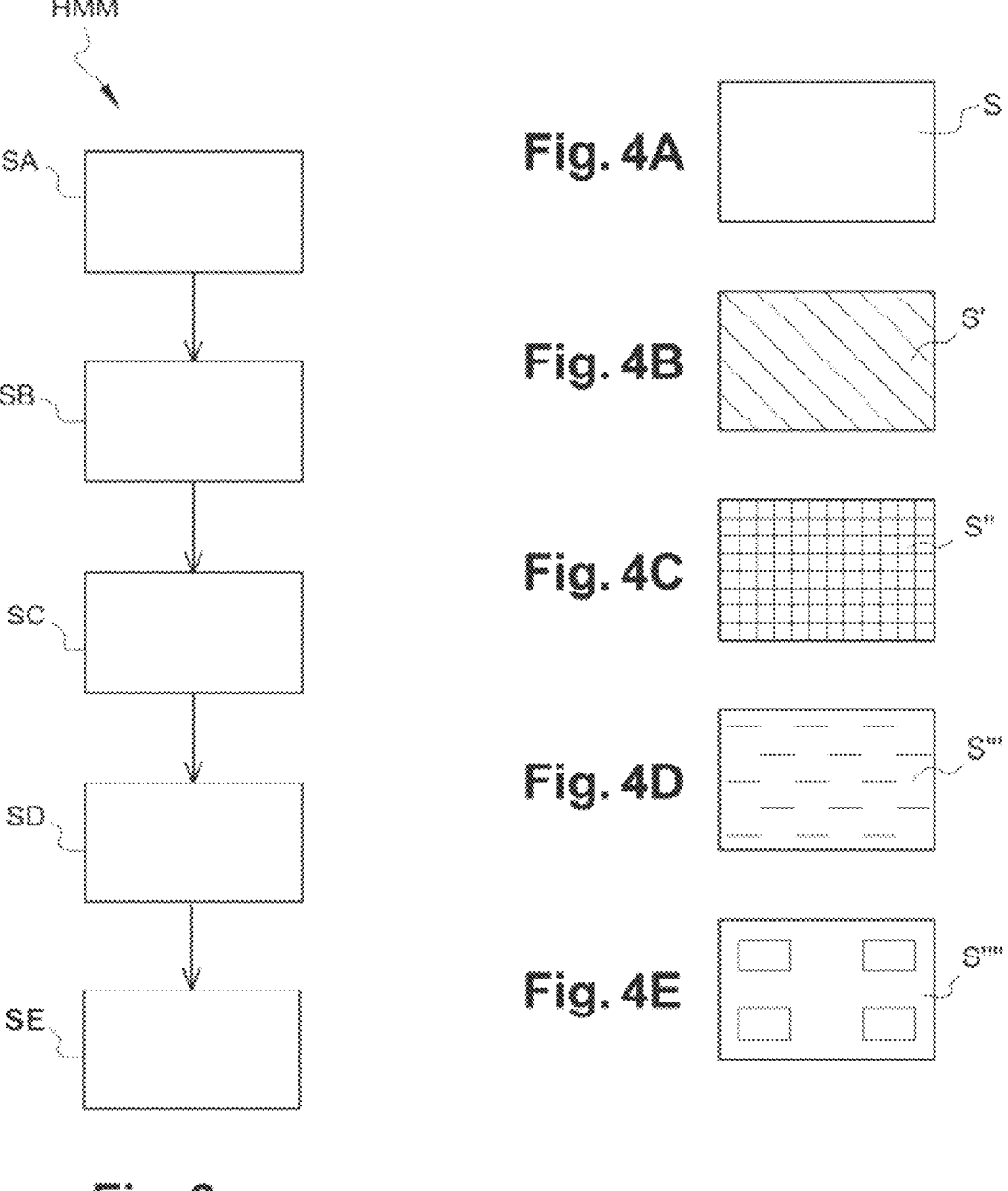
FIG. 3 is a flow chart of an exemplary hybrid manufacturing method according to one example.

A hybrid manufacturing method HMM and a device 100 obtained by such a hybrid manufacturing method HMM are described with reference to FIG. 1 to FIG. 4E. FIG. 2 shows specific non limitative example of device obtained by such a hybrid manufacturing method HMM, such as a bracket 52A or an informative element 52B.

The hybrid manufacturing method HHM comprises a step SA of providing a base member 10, the base member 10 comprising a metallic portion 12 provided with a coating 14. In the present example, the coating 14 may comprise an optional e-coat primer 14A and a top-coat layer 14B.

The hybrid manufacturing method HHM comprises a step SB of providing a surface treatment to all or part of the coating 14, the surface treatment comprising a mechanical, a chemical and/or a physical treatment, to obtain a treated base surface S. For example, the surface treatment SB may comprise removing at least in part the coating 14. For example, the surface treatment SB may comprise removing all or part of the top-coat layer 14B only. This may help to reduce as far as possible manufacturing time and associated costs. In a variant, the surface SB may also comprise removing all or part of the e-coat primer 14A. For example, the treated surface S may be formed by a surface wherein all the coating 14 has been continuously removed as shown in FIG. 4A. In another example, the surface treatment may comprise a predetermined pattern. For example, the predetermined pattern may result from a removal of the coating 14 in accordance with a hatched pattern (see FIG. 4B, treated base surface S'), a grid pattern (see FIG. 4C, treated base surface S"), a staggered pattern (see FIG. 4D, treated base surface S'"), a pad pattern (see FIG. 4E, treated base surface S""), etc. The pattern for the top-coat 14B may be similar to or different from the pattern for the e-coat primer 14A. For example, the coating 14 may comprise resin and the surface treatment SB may comprise thermal or chemical treatment to provide adhesive features to at least a portion of the coating 14. This may help to reduce as far as possible manufacturing time and associated costs.

The hybrid manufacturing method HHM comprises a step SD of forming an additional part 20 onto the treated base surface S by additive manufacturing. For example, the additive manufacturing SD may be a fused deposition modeling, also known as FDM. The additional part 20 may be made of polymeric material, for example thermoplastic, thermoset or resin. For example, the polymeric material may be a fiber reinforced polymer or thermoplastic.

The steps SA, SB and SD may be carried out in that order.

In the present example, the hybrid manufacturing method HHM may comprise an optional step SC, before the additive manufacturing step SD and after the surface treatment step SB, of providing a layer 16 of adhesive material onto the treated base surface S. In the present example, the hybrid manufacturing method HHM may comprise an optional step SE, after the additive manufacturing step SD, a post-treatment such as annealing at high temperature, for example 100° C.

As shown in FIG. 2, the base member 12 may be all or part of a vehicle chassis 50A or of a vehicle body 50B. For example, the additional part 20 may form a bracket 52A, or a not shown fastener, mounting part, etc., and may be formed either on the vehicle chassis 50A or on the vehicle body 50B. According to another example, the addition part 20 may form an informative element 52B such as a brand plate, a logo, a location marker, etc. and may be formed either on the vehicle chassis 50A or on the vehicle body 50B.

The terminology used herein is for the purpose of describing particular aspects only and is not intended to be limiting of the disclosure. As used herein, the singular forms "a," "an," and "the" are intended to include the plural forms as well, unless the context clearly indicates otherwise. As used herein, the term "and/or" includes any and all combinations of one or more of the associated listed items. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

It will be understood that, although the terms first, second, etc., may be used herein to describe various elements, these elements should not be limited by these terms. These terms are only used to distinguish one element from another. For example, a first element could be termed a second element, and, similarly, a second element could be termed a first element without departing from the scope of the present disclosure.

Relative terms such as "below" or "above" or "upper" or "lower" or "horizontal" or "vertical" may be used herein to describe a relationship of one element to another element as illustrated in the Figures. It will be understood that these terms and those discussed above are intended to encompass different orientations of the device in addition to the orientation depicted in the Figures. It will be understood that when an element is referred to as being "connected" or "coupled" to another element, it can be directly connected or coupled to the other element, or intervening elements may be present. In contrast, when an element is referred to as being "directly connected" or "directly coupled" to another element, there are no intervening elements present.

Unless otherwise defined, all terms (including technical and scientific terms) used herein have the same meaning as commonly understood by one of ordinary skill in the art to which this disclosure belongs. It will be further understood that terms used herein should be interpreted as having a meaning consistent with their meaning in the context of this specification and the relevant art and will not be interpreted in an idealized or overly formal sense unless expressly so defined herein.

It is to be understood that the present disclosure is not limited to the aspects described above and illustrated in the drawings; rather, the skilled person will recognize that many changes and modifications may be made within the scope of the present disclosure and appended claims. In the drawings and specification, there have been disclosed aspects for purposes of illustration only and not for purposes of limitation, the scope of the inventive concepts being set forth in the following claims.

What is claimed is:

1. A hybrid manufacturing method comprising:

providing a base member, the base member comprising a metallic portion provided with a coating, the coating comprising resin, an e-coat primer, and a top-coat layer;

providing a surface treatment to all or part of the coating, the surface treatment comprising thermal or chemical treatment, to obtain a treated base surface to provide adhesive features to at least a portion of the coating; and forming an additional part onto the treated base surface by additive manufacturing.

2. The hybrid manufacturing method of claim 1, wherein the surface treatment comprises removing at least in part the coating.

3. A hybrid manufacturing method comprising:

providing a base member, the base member comprising a metallic portion provided with a coating, the coating comprising an e-coat primer and a top-coat layer;

providing a surface treatment to all or part of the coating comprising removing all or part of the top-coat layer only, the surface treatment comprising thermal or chemical treatment, to obtain a treated base surface; and forming an additional part onto the treated base surface by additive manufacturing.

4. The hybrid manufacturing method of claim 1, wherein the surface treatment comprises a predetermined pattern.

5. The hybrid manufacturing method of claim 1, comprising, before forming the additional part, providing a layer of adhesive material onto the treated base surface.

6. The hybrid manufacturing method of claim 1, comprising, after forming the additional part, a post-treatment.

7. The hybrid manufacturing method of claim 1, wherein the additional part is made of polymeric material.

8. The hybrid manufacturing method of claim 1, wherein the base member is all or part of a vehicle chassis or of a vehicle body, and the additional part is a bracket, a fastener, a mounting part, or an informative element.

*　*　*　*　*